(12) United States Patent
Ahn et al.

(10) Patent No.: US 9,674,148 B2
(45) Date of Patent: *Jun. 6, 2017

(54) RULE SWAPPING IN A PACKET NETWORK

(71) Applicant: Centripetal Networks, Inc., Herndon, VA (US)

(72) Inventors: David K. Ahn, Winston-Salem, NC (US); Steven Rogers, Leesburg, VA (US); Sean Moore, Hollis, NH (US)

(73) Assignee: Centripetal Networks, Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/921,718

(22) Filed: Oct. 23, 2015

(65) Prior Publication Data

US 2016/0197882 A1 Jul. 7, 2016

Related U.S. Application Data

(63) Continuation of application No. 13/739,178, filed on Jan. 11, 2013, now Pat. No. 9,203,806.

(51) Int. Cl.
*H04L 29/06* (2006.01)
*H04L 12/24* (2006.01)
*G06N 5/02* (2006.01)

(52) U.S. Cl.
CPC .......... *H04L 63/0263* (2013.01); *G06N 5/02* (2013.01); *H04L 41/16* (2013.01)

(58) Field of Classification Search
CPC ............... H04L 63/0263; H04L 69/325; H04L 43/0888; H04L 43/0835; H04L 1/0068; H04L 1/0072; H04L 1/0041; H04L 1/08; H04L 1/0071; H04L 2001/0097;
(Continued)

(56) References Cited

U.S. PATENT DOCUMENTS 6,098,172 A 8/2000 Coss et al.
6,147,976 A 11/2000 Shand et al.
6,226,372 B1 5/2001 Beebe et al.
(Continued)

FOREIGN PATENT DOCUMENTS

AU 2005328336 B2 9/2011
AU 2006230171 B2 6/2012
(Continued)

OTHER PUBLICATIONS

Jan. 11, 2016—(US) Non Final Rejection—U.S. Appl. No. 14/698,560.
(Continued)

*Primary Examiner* — Michael Pyzocha
(74) *Attorney, Agent, or Firm* — Banner & Witcoff, Ltd.

(57) ABSTRACT

In some variations, first and second rule sets may be received by a network protection device. The first and second rule sets may be preprocessed. The network protection device may be configured to process packets in accordance with the first rule set. Packets may be received by the network protection device. A first portion of the packets may be processed in accordance with the first rule set. The network protection device may be reconfigured to process packets in accordance with the second rule set. A second portion of the packets may be processed in accordance with the second rule set.

20 Claims, 9 Drawing Sheets

(58) Field of Classification Search
CPC ... H04L 1/0057; H04L 1/1809; H04L 1/1812; H04L 41/16; G06N 5/02
See application file for complete search history.

(56) References Cited

U.S. PATENT DOCUMENTS

| | | | |
|---|---|---|---|
| 6,317,837 | B1 | 11/2001 | Kenworthy |
| 6,484,261 | B1 | 11/2002 | Wiegel |
| 6,611,875 | B1* | 8/2003 | Chopra ................ H04L 29/06 709/238 |
| 6,662,235 | B1 | 12/2003 | Callis et al. |
| 7,089,581 | B1 | 8/2006 | Nagai et al. |
| 7,107,613 | B1 | 9/2006 | Chen et al. |
| 7,215,637 | B1 | 5/2007 | Ferguson et al. |
| 7,227,842 | B1 | 6/2007 | Ji et al. |
| 7,237,267 | B2 | 6/2007 | Rayes et al. |
| 7,263,099 | B1 | 8/2007 | Woo et al. |
| 7,299,353 | B2 | 11/2007 | Le Pennec et al. |
| 7,331,061 | B1 | 2/2008 | Ramsey et al. |
| 7,478,429 | B2 | 1/2009 | Lyon |
| 7,539,186 | B2 | 5/2009 | Aerrabotu et al. |
| 7,610,621 | B2 | 10/2009 | Turley et al. |
| 7,684,400 | B2 | 3/2010 | Govindarajan et al. |
| 7,710,885 | B2 | 5/2010 | Ilnicki et al. |
| 7,721,084 | B2 | 5/2010 | Salminen et al. |
| 7,818,794 | B2 | 10/2010 | Wittman |
| 7,954,143 | B2 | 5/2011 | Aaron |
| 8,004,994 | B1 | 8/2011 | Darisi et al. |
| 8,037,517 | B2 | 10/2011 | Fulp et al. |
| 8,042,167 | B2 | 10/2011 | Fulp et al. |
| 8,117,655 | B2 | 2/2012 | Spielman |
| 8,176,561 | B1 | 5/2012 | Hurst et al. |
| 8,306,994 | B2 | 11/2012 | Kenworthy |
| 8,495,725 | B2 | 7/2013 | Ahn |
| 8,726,379 | B1 | 5/2014 | Stiansen et al. |
| 8,806,638 | B1* | 8/2014 | Mani ................ H04L 63/0227 726/24 |
| 8,856,926 | B2 | 10/2014 | Narayanaswamy et al. |
| 8,935,785 | B2 | 1/2015 | Pandrangi |
| 9,094,445 | B2 | 7/2015 | Moore et al. |
| 9,124,552 | B2 | 9/2015 | Moore |
| 9,137,205 | B2 | 9/2015 | Rogers et al. |
| 9,154,446 | B2 | 10/2015 | Gemelli et al. |
| 9,160,713 | B2 | 10/2015 | Moore |
| 2001/0039579 | A1 | 11/2001 | Trcka et al. |
| 2001/0039624 | A1 | 11/2001 | Kellum |
| 2002/0016858 | A1 | 2/2002 | Sawada et al. |
| 2002/0038339 | A1 | 3/2002 | Xu |
| 2002/0049899 | A1 | 4/2002 | Kenworthy |
| 2002/0164962 | A1 | 11/2002 | Mankins et al. |
| 2002/0165949 | A1 | 11/2002 | Na et al. |
| 2002/0186683 | A1 | 12/2002 | Buck et al. |
| 2002/0198981 | A1 | 12/2002 | Corl et al. |
| 2003/0035370 | A1 | 2/2003 | Brustoloni |
| 2003/0097590 | A1* | 5/2003 | Syvanne ............ H04L 63/0227 726/4 |
| 2003/0105976 | A1 | 6/2003 | Copeland |
| 2003/0120622 | A1 | 6/2003 | Nurmela et al. |
| 2003/0123456 | A1 | 7/2003 | Denz et al. |
| 2003/0142681 | A1 | 7/2003 | Chen et al. |
| 2003/0145225 | A1 | 7/2003 | Bruton, III et al. |
| 2003/0154297 | A1 | 8/2003 | Suzuki et al. |
| 2003/0154399 | A1 | 8/2003 | Zuk et al. |
| 2003/0188192 | A1 | 10/2003 | Tang et al. |
| 2003/0212900 | A1 | 11/2003 | Liu et al. |
| 2004/0010712 | A1 | 1/2004 | Hui et al. |
| 2004/0073655 | A1 | 4/2004 | Kan et al. |
| 2004/0088542 | A1 | 5/2004 | Daude et al. |
| 2004/0093513 | A1 | 5/2004 | Cantrell et al. |
| 2004/0098511 | A1 | 5/2004 | Lin et al. |
| 2004/0151155 | A1 | 8/2004 | Jouppi |
| 2004/0177139 | A1 | 9/2004 | Schuba et al. |
| 2004/0193943 | A1 | 9/2004 | Angelino et al. |
| 2004/0199629 | A1 | 10/2004 | Bomer et al. |
| 2004/0205360 | A1 | 10/2004 | Norton et al. |
| 2004/0250124 | A1 | 12/2004 | Chesla et al. |
| 2005/0010765 | A1 | 1/2005 | Swander et al. |
| 2005/0024189 | A1 | 2/2005 | Weber |
| 2005/0114704 | A1 | 5/2005 | Swander |
| 2005/0117576 | A1 | 6/2005 | McDysan et al. |
| 2005/0125697 | A1 | 6/2005 | Tahara |
| 2005/0138204 | A1 | 6/2005 | Iyer et al. |
| 2005/0138353 | A1 | 6/2005 | Spies et al. |
| 2005/0141537 | A1 | 6/2005 | Kumar et al. |
| 2005/0183140 | A1 | 8/2005 | Goddard |
| 2005/0229246 | A1 | 10/2005 | Rajagopal et al. |
| 2005/0251570 | A1 | 11/2005 | Heasman et al. |
| 2005/0286522 | A1 | 12/2005 | Paddon et al. |
| 2006/0048142 | A1 | 3/2006 | Roese et al. |
| 2006/0053491 | A1 | 3/2006 | Khuti et al. |
| 2006/0070122 | A1 | 3/2006 | Bellovin |
| 2006/0104202 | A1 | 5/2006 | Reiner |
| 2006/0114899 | A1 | 6/2006 | Toumura et al. |
| 2006/0136987 | A1 | 6/2006 | Okuda |
| 2006/0137009 | A1 | 6/2006 | Chesla |
| 2006/0146879 | A1 | 7/2006 | Anthias et al. |
| 2006/0195896 | A1 | 8/2006 | Fulp et al. |
| 2006/0212572 | A1 | 9/2006 | Afek et al. |
| 2006/0248580 | A1* | 11/2006 | Fulp ................ H04L 63/20 726/11 |
| 2006/0262798 | A1 | 11/2006 | Joshi et al. |
| 2007/0083924 | A1 | 4/2007 | Lu |
| 2007/0211644 | A1 | 9/2007 | Ottamalika et al. |
| 2007/0240208 | A1 | 10/2007 | Yu et al. |
| 2008/0005795 | A1 | 1/2008 | Acharya et al. |
| 2008/0043739 | A1 | 2/2008 | Suh et al. |
| 2008/0072307 | A1 | 3/2008 | Maes |
| 2008/0077705 | A1 | 3/2008 | Li et al. |
| 2008/0163333 | A1 | 7/2008 | Kasralikar |
| 2008/0229415 | A1 | 9/2008 | Kapoor et al. |
| 2008/0235755 | A1 | 9/2008 | Blaisdell et al. |
| 2008/0279196 | A1 | 11/2008 | Friskney et al. |
| 2008/0301765 | A1 | 12/2008 | Nicol et al. |
| 2009/0138938 | A1 | 5/2009 | Harrison et al. |
| 2009/0172800 | A1 | 7/2009 | Wool |
| 2009/0222877 | A1 | 9/2009 | Diehl et al. |
| 2009/0240698 | A1 | 9/2009 | Shukla et al. |
| 2009/0328219 | A1* | 12/2009 | Narayanaswamy H04L 63/1425 726/23 |
| 2010/0011433 | A1 | 1/2010 | Harrison et al. |
| 2010/0011434 | A1 | 1/2010 | Kay |
| 2010/0082811 | A1 | 4/2010 | Van Der Merwe et al. |
| 2010/0095367 | A1 | 4/2010 | Narayanaswamy |
| 2010/0107240 | A1 | 4/2010 | Thaler et al. |
| 2010/0132027 | A1 | 5/2010 | Ou |
| 2010/0199346 | A1 | 8/2010 | Ling et al. |
| 2010/0211678 | A1 | 8/2010 | McDysan et al. |
| 2010/0232445 | A1 | 9/2010 | Bellovin |
| 2010/0242098 | A1 | 9/2010 | Kenworthy |
| 2010/0268799 | A1 | 10/2010 | Maestas |
| 2010/0296441 | A1 | 11/2010 | Barkan |
| 2010/0303240 | A1 | 12/2010 | Beachem et al. |
| 2011/0055916 | A1 | 3/2011 | Ahn |
| 2011/0055923 | A1 | 3/2011 | Thomas |
| 2011/0088092 | A1 | 4/2011 | Nguyen et al. |
| 2011/0141900 | A1 | 6/2011 | Jayawardena et al. |
| 2011/0185055 | A1 | 7/2011 | Nappier et al. |
| 2011/0270956 | A1 | 11/2011 | McDysan et al. |
| 2012/0023576 | A1 | 1/2012 | Sorensen et al. |
| 2012/0106354 | A1 | 5/2012 | Pleshek et al. |
| 2012/0113987 | A1 | 5/2012 | Riddoch et al. |
| 2012/0240135 | A1* | 9/2012 | Risbood ................ G06F 8/61 719/328 |
| 2012/0264443 | A1 | 10/2012 | Ng et al. |
| 2012/0314617 | A1* | 12/2012 | Erichsen ............ H04L 61/6059 370/254 |
| 2012/0331543 | A1 | 12/2012 | Bostrom et al. |
| 2013/0047020 | A1 | 2/2013 | Hershko et al. |
| 2013/0059527 | A1 | 3/2013 | Hasesaka et al. |
| 2013/0061294 | A1 | 3/2013 | Kenworthy |
| 2013/0117852 | A1 | 5/2013 | Stute |
| 2013/0254766 | A1 | 9/2013 | Zuo et al. |
| 2013/0305311 | A1 | 11/2013 | Puttaswamy Naga et al. |
| 2014/0075510 | A1 | 3/2014 | Sonoda et al. |

(56) References Cited

U.S. PATENT DOCUMENTS

| | | | |
|---|---|---|---|
| 2014/0115654 | A1 | 4/2014 | Rogers et al. |
| 2014/0201123 | A1 | 7/2014 | Ahn et al. |
| 2014/0215574 | A1 | 7/2014 | Erb et al. |
| 2014/0281030 | A1 | 9/2014 | Cui et al. |
| 2014/0283004 | A1 | 9/2014 | Moore |
| 2014/0283030 | A1 | 9/2014 | Moore et al. |
| 2014/0366132 | A1 | 12/2014 | Stiansen et al. |
| 2015/0237012 | A1 | 8/2015 | Moore |
| 2015/0304354 | A1 | 10/2015 | Rogers et al. |
| 2015/0334125 | A1 | 11/2015 | Bartos et al. |

FOREIGN PATENT DOCUMENTS

| | | | |
|---|---|---|---|
| CA | 2600236 | A1 | 10/2006 |
| EP | 1006701 | A2 | 6/2000 |
| EP | 1313290 | A1 | 5/2003 |
| EP | 1484884 | A2 | 12/2004 |
| EP | 1677484 | A2 | 7/2006 |
| EP | 2385676 | A1 | 11/2011 |
| EP | 2498442 | A1 | 9/2012 |
| EP | 1864226 | B1 | 5/2013 |
| KR | 20010079361 | A | 8/2001 |
| WO | 2005046145 | A1 | 5/2005 |
| WO | 2006093557 | A2 | 9/2006 |
| WO | 2006105093 | A2 | 10/2006 |
| WO | 2007109541 | A2 | 9/2007 |
| WO | 2011038420 | A2 | 3/2011 |
| WO | 2012146265 | A1 | 11/2012 |

OTHER PUBLICATIONS

Apr. 27, 2011—(WO) International Search Report and Written Opinion—App PCT/US2010/054520.
Mar. 4, 2011—(US) Notice of Allowance—U.S. Appl. No. 11/316,331.
Mar. 3, 2011—(EP) Communication Pursuant to Rules 70(2) and 70a(2)—App 06758213.0.
Feb 14, 2011—(EP) Search Report—App 06758213.0.
Fulp, Errin: "Errin Fulp," XP002618346, www.cs.wfu.edu/fulp/ewfPub.html, pp. 1-5 (Copyright 2010).
Sep. 30, 2010—(US) Office Action—U.S. Appl. No. 11/390,976.
Sep. 10, 2010—(AU) Office Action—App 2006230171.
Aug. 20, 2010—(AU) Office Action—App 2005328336.
Jun. 23, 2010—(US) Final Rejection—U.S. Appl. No. 11/316,331.
Apr. 29, 2010—(US) Interview Summary—U.S. Appl. No. 11/390,976.
Mar. 26, 2010—(US) Final Rejection—U.S. Appl. No. 11/390,976.
Sep. 14, 2009 (US) Office Action—U.S. Appl. No. 11/316,331.
Jun. 24, 2009—(US) Office Action—U.S. Appl. No. 11/390,976.
Jul. 3, 2008—(WO) Written Opinion of the International Searching Authority—App PCT/US06/11291.
Aug. 31, 2007—(EP) Communication Pursuant to Rules 109 and 110—App 05857614.1.
Acharya et al, "Optwall: A Hierarchical Traffic-Aware Firewall," Department of Computer Science, Telecommunications Program, University of Pittsburgh, pp. 1-11 (2007).
Sep. 11, 2006—(WO) Written Opinion of the International Searching Authority—App PCT/US05/47008.
Tarsa et al., "Balancing Trie-Based Policy representations for Network Firewalls," Department of Computer Science, Wake Forest University, pp. 1-6 (2006).
Fulp, "Trie-Based Policy Representations for Network Firewalls," Proceedings of the IEEE International Symposium on Computer Communications (2005).
E. Fulp, "Optimization of Network Firewall Policies Using Ordered Sets and Directed Acyclical Graphs", Technical Report, Computer Scient Department, Wake Forest University, Jan. 2004.
E. Fulp et al. "Network Firewall Policy Tries", Technical Report, Computer Science Department, Wake Forest University, 2004.
E. Al-Shaer et al., "Modeling and Management of Firewall Policies", IEEE Transactions on Network and Service Management, 1(1): 2004.
E.W. Fulp, "Firewall Architectures for High Speed Networks", U.S. Department of Energy Grant Application, Funded Sep. 2003.
E. Al-Shaer et al., "Firewall Policy Advisor for Anomaly Discovery and Rule Editing", Proceedings of the IFIP/IEEE International Symposium on Integrated Network Management, 2003.
V.P. Ranganath, "A Set-Based Approach to Packet Classification", Proceedings of the IASTED International Conference on Parallel and Distributed Computing and Systems, 889-894, 2003.
M. Christiansen et al., "Using IDDsfor Packet Filtering", Technical Report, BRICS, Oct. 2002.
Lee et al., "Development Framework for Firewall Processors," IEEE, pp. 352-355 (2002).
L. Qui et al. "Fast Firewall Implementations for Software and Hardware-Based Routers", Proceedings of ACM Sigmetncs, Jun. 2001.
D. Eppstein et al., "Internet Packet Filter Management and Rectangle Geometry", Proceedings of the Symposium on Discrete Algorithms, 827-835, 2001.
E. Fulp, "Preventing Denial of Service Attacks on Quality of Service", Proceedings of the 2001 DARPA Information Survivability Conference and Exposition II, 2001.
S. Goddard et al., "An Unavailability Analysis of Firewall Sandwich Configurations", Proceedings of the 6th IEEE Symposium on High Assurance Systems Engineering, 2001.
G.V. Rooij, "Real Stateful TCP Packet Filtering in IP Filter", Proceedings of the 10th USENIX Security Symposium, 2001.
P. Warkhede et al., "Fast Packet Classification for Two-Dimensional Conflict-Free Filters", Proceedings of IEEE INFOCOM, 1434-1443, 2001.
D. Decasper et al., "Router Plugins: A Software Architecture for Next-Generation Routers", IEEE/ACM Transactions on Networking, 8(1): Feb. 2000.
A. Feldmann et al., "Tradeoffs for Packet Classification", Proceedings of the IEEE INFOCOM, 397-413, 2000.
X. Gan et al., "LSMAC vs. LSNAT: Scalable Cluster-based Web servers", Journal of Networks, Software Tools, and Applications, 3(3): 175-185, 2000.
A. Hari et al., "Detecting and Resolving Packet Filter Conflicts", Proceedings of IEEE INFOCOM, 1203-1212, 2000.
O. Paul et al., "A full Bandwidth ATM Firewall", Proceedings of the 6th European Symposium on Research in Computer Security ESORICS'2000, 2000.
J. Xu et al., "Design and Evaluation of a High-Performance ATM Firewall Switch and Its Applications", IEEE Journal on Selected Areas in Communications, 17(6): 1190-1200, Jun. 1999.
C. Benecke, "A Parallel Packet Screen for High Speed Networks", Proceedings of the 15th Annual Computer Security Applications Conference, 1999.
R. Funke et al., "Performance Evaluation of Firewalls in Gigabit-Networks", Proceedings of the Symposium on Performance Evaluation of Computer and Telecommunication Systems, 1999.
S. Suri et al., "Packet Filtering in High Speed Networks", Proceedings of the Symposium on Discrete Algorithms, 969-970, 1999.
J. Ellermann et al., "Firewalls for ATM Networks", Proceedings of INFOSEC'COM, 1998.
V. Srinivasan et al., "Fast and Scalable Layer Four Switching", Proceedings of ACM SIGCOMM, 191-202, 1998.
M. Degermark et al., "Small Forwarding Tables for Fast Routing Lookups", Proceedings of ACM SIGCOMM, 4-13, 1997.
S,M. Bellovin et al., "Network Firewalls", IEEE Communications Magazine, 50-57, 1994.
W. E. Leland et al., "On the Self-Similar Nature of Ethernet Traffic", IEEE Transactions on Networking, 2(1); 15, 1994.
G. Brightwell et al., "Counting Linear Extensions is #P-Complete", Proceedings of the Twenty-Third Annual ACM Symposium on Theory of Computing, 1991.
M. Al-Suwaiyel et al., "Algorithms for Trie Compaction", ACM Transactions on Database Systems, 9(2): 243-263, Jun. 1984.
D. Corner, "Analysis of a Heuristic for Full Trie Minimization", ACM Transactions on Database Systems, 6(3): 513-537, Sep. 1981.

(56) References Cited

OTHER PUBLICATIONS

R.L. Graham et al., "Optimization and Approximation in Deterministic Sequencing and Scheduling: A Survey", Annals of Discrete Mathematics, 5: 287-326, 1979.
E.L. Lawler, "Sequencing Jobs to Minimize Total Weighted Completion oTime Subject to Precedence Constraints", Annals of Discrete Mathematics, 2: 75-90, 1978.
J.K. Lenstra et al., "Complexity of Scheduling Under Precedence Constraints", Operations Research, 26(1): 22-35,1978.
R. Rivest, "On Self-Organizing Sequential Search Heuristics", Communications of the ACM, 19(2): 1976.
W.E. Smith, "Various Optimizers for Single-Stage Productions", Naval Research Logistics Quarterly, 3: 59-66, 1956.
Bellion, "High Performance Packet Classification", http://www.hipac.org (Publication Date Unknown).
Oct. 18, 2011—(EP) Communication Pursuant to Article 94(3)—App 06 758 213.0.
Jun. 9, 2011—(US) Notice of Allowance—U.S. Appl. No. 11/390,976.
Jun. 26, 2012—(EP) Extended Search Report—App 05857614.1.
Jun. 9, 2012—(AU) Notice of Acceptance—App 2006230171.
Nov. 11, 2011—(AU) Second Office Action—App 2006230171.
Jan. 17, 2013—(CA) Office Action—App 2,600,236.
Jan. 16, 2013—(CA) Office Action—App 2,594,020.
Nov. 20, 2012—(EP) Communication under rule 71(3)—App 06 758 213.0.
Apr. 18, 2013—(EP) Decision to Grant a European Patent—App 06758212.0.
Aug. 25, 2011—(US) Non Final Rejection—U.S. Appl. No. 12/871,806.
Feb 6, 2012—(US) Final Rejection—U.S. Appl. No. 12/871,806.
Aug. 7, 2012—(US) Non Final Rejection—U.S. Appl. No. 12/871,806.
Nov. 26, 2012—(US) Final Rejection—U.S. Appl. No. 12/871,806.
Apr. 4, 2013—(US) Notice of Allowance—U.S. Appl. No. 12/871,806.
Jan. 14, 2015—(EP) Extended Search Report—App 10819667.6.
May 26, 2014—(CA) Office Action—App 2010297968.
May 25, 2015—(AU) Notice of Acceptance—App 2010297968.
May 14, 2015—(US) Non Final Rejection—U.S. Appl. No. 13/940,240.
Nov. 27, 2015—(US) Final Rejection—U.S. Appl. No. 13/940,240.
Jan. 28, 2016—(WO) International Search Report and Written Opinion—App PCT/US2015/062691.
Statement RE: Related Application, dated Jul. 24, 2015.
Dec. 22, 2015—(US) Final Office Action—U.S. Appl. No. 14/714,207.
Feb. 26, 2016—(US) Non Final Office Action—U.S. Appl. No. 14/253,992.
Apr. 15, 2016—(US) Notice of Allowance—U.S. Appl. No. 14/855,374.
International Search Report and Written Opinion for International App. No. PCT/US2013/057502, dated Nov. 7, 2013.
International Search Report and Written Opinion for International App. No. PCT/US2013/072566, dated Mar. 24, 2014.
International Search Report and Written Opinion for International App. No. PCT/US2014/023286, dated Jun. 24, 2014.
International Search Report and Written Opinion for International App. No. PCT/US2014/027723, dated Jun. 26, 2014.
Communication Relating to the Results of the Partial International Search for International App. No. PCT/US2015/024691, dated Jul. 10, 2015.
Greenwald et al., Designing an Academic Firewall: Policy, Practice, and Experience With SURF, Proceedings of SNDSS '96, IEEE, 1996, Department of Computer Science, Stanford University, Stanford, CA.
Reumann et al., Adaptive Packet Filters, IEEE, 2001, Department of Electrical Engineering and Computer Science, The University of Michigan, Ann Arbor, MI.
Mizuno et al., A New Remote Configurable Firewall System for Home-use Gateways, IEEE, 2004, NTT Information Sharing Platform Laboratories.
Kindervag et al., Build Security Into Your Network's DNA: The Zero Trust Network Architecture, Nov. 5, 2010, Forrester Research, Inc., Cambridge MA.
Moore, SBIR Case Study: Centripetal Networks, How CNI Leveraged DHS S&T SBIR Funding to Launch a Successful Cyber Security Company, Cyber Security Division, 2012 Principal Investigators' Meeting, Oct. 10, 2012, Centripetal Networks, Inc.
Designing a Zero Trust Network With Next-Generation Firewalls, Palo Alto Networks: Technology Brief, viewed Oct. 21, 2012, Palo Alto Networks, Santa Clara, CA.
Control Plane Policing Implementation Best Practices, Mar. 13, 2013, Cisco Systems.
International Preliminary Report on Patentability for International App. No. PCT/US2013/072566, dated Jul. 23, 2015.
International Search Report and Written Opinion for International App. No. PCT/US2015/024691, dated Sep. 16, 2015.
International Preliminary Report on Patentability for International App. No. PCT/US2013/057502, dated May 7, 2015.
International Preliminary Report on Patentability for International App. No. PCT/US2014/023286, dated Sep. 24, 2015.
International Preliminary Report on Patentability for International App. No. PCT/US2014/027723, dated Sep. 24, 2015.
Nov. 2, 2015—(AU) Office Action—App 2013372879.
Apr. 26, 2016—(US) Office Action—U.S. Appl. No. 14/745,207.
May 6, 2016—(US) Office Action—U.S. Appl. No. 14/714,207.
May 13, 2016—(US) Office Action—U.S. Appl. No. 13/940,240.
Jun. 14, 2016—(US) Office Action—U.S. Appl. No. 14/625,486.
Feb. 25, 2016—(AU) Office Action—App 2014249055.
Feb. 24, 2016—(AU) Office Action—App 2014228257.
Jun. 9, 2016—(WO) International Search Report—PCT/US2016/026339.
Jun. 16, 2016—(CA) Office Action—App 2,888,935.
Jul. 11, 2016—(EP) Office Action—App 14720824.3.
Jul. 20, 2016—(AU) Office Action—App 2013335255.
Oct. 5, 2016—(US) Notice of Allowance—U.S. Appl. No. 14/698,560.
Sep. 13, 2016—(CA) Office Action—App 2,902,206.
Sep. 14, 2016—(CA) Office Action—App 2,897,737.
Sep. 26, 2016—(CA) Office Action—App 2,902,158.
Oct. 26, 2016—(US) Office Action—U.S. Appl. No. 13/940,240.
Nov. 21, 2016—(US) Office Action—U.S. Appl. No. 14/745,207.
Dec. 5, 2016—(US) Notice of Allowance—U.S. Appl. No. 14/714,207.
Singh, Rajeev et al. "Detecting and Reducing the Denial of Service attacks in WLANs", Dec. 2011, World Congress on Information and Communication TEchnologies, pp. 968-973.
Feb. 10, 2011—(US) Notice of Allowance—U.S. Appl. No. 14/625,486.
Apr. 12, 2017—(US) Office Action—U.S. Appl. No. 14/757,638.

* cited by examiner

RULE SWAPPING IN A PACKET NETWORK

CROSS-REFERENCE TO RELATED APPLICATION

This application is a continuation of and claims priority to U.S. patent application Ser. No. 13/739,178, filed Jan. 11, 2013, and entitled "RULE SWAPPING IN A PACKET NETWORK," the disclosure of which is incorporated by reference herein in its entirety and made part hereof.

BACKGROUND

Network protection devices (e.g., firewalls) implement rules with respect to packet-switched network traffic entering or leaving the networks they protect. Such devices compare the rules with the traffic. If a match is found, then the devices apply the actions associated with the rules to the traffic, e.g., the traffic may be allowed to cross the network boundary, or the traffic may be prevented from crossing the boundary. Such rules are often grouped into rule sets, which may form one or more network policies. As networks increase in complexity, the number of rules in a rule set may correspondingly increase. Similarly, the number of rules in a rule set may increase due to a desire on the part of an administrator to manage network traffic with a high level of granularity.

Network protection devices may require time to switch between rule sets. As rule sets increase in complexity, the time required for switching between them presents obstacles for effective implementation. For example, a network protection device may be unable to process network traffic while switching between rule sets due to the utilization of resources for implementing the new rule set. Additionally, while implementing a new rule set, a network protection device may continue processing packets in accordance with an outdated rule set. In certain circumstances (e.g., in the event of a network attack), such processing may exacerbate rather than mitigate the impetus for the rule set switch (e.g., the effect of the network attack).

SUMMARY

The following presents a simplified summary in order to provide a basic understanding of some aspects of the disclosure. It is neither intended to identify key or critical elements of the disclosure nor to delineate the scope of the disclosure. The following summary merely presents some concepts in a simplified form as a prelude to the description below.

In some variations, first and second rule sets may be received by a network protection device. The first and second rule sets may be preprocessed. For example, the first and second rule sets may be optimized to improve performance. The network protection device may be configured to process packets in accordance with the first rule set. Packets may be received by the network protection device. A first portion of the packets may be processed in accordance with the first rule set. The network protection device may be reconfigured to process packets in accordance with the second rule set. A second portion of the packets may be processed in accordance with the second rule set.

In some embodiments, the network protection device may include multiple processors. The processors, or a portion thereof, may be utilized for processing the first portion of the packets in accordance with the first rule set. Reconfiguring the network protection device to process packets in accordance with the second rule set may include synchronizing the processors. Synchronizing the processors may include signaling the processors to process packets in accordance with the second rule set. Responsive to signaling the processors to process packets in accordance with the second rule set, the processors may cease processing packets and may cache any unprocessed packets. The processors may be reconfigured to process packets in accordance with the second rule set. Once reconfigured, the processors may signal completion of the reconfiguration process. Responsive to signaling completion of the reconfiguration process, the processors may process the cached unprocessed packets in accordance with the second rule set.

In some embodiments, configuration information for configuring the network protection device to process packets in accordance with the first rule set may be stored. The stored configuration information may be utilized to reconfigure the network protection device to process packets in accordance with the first rule set, and a third portion of the packets may be processed in accordance with the first rule set.

In some embodiments, the first rule set may specify a set of network addresses for which packets should be forwarded and the second rule set may specify a set of network addresses for which packets should be forwarded. The second set of network addresses may include fewer network addresses than the first set. Alternatively, the second set of network addresses may include more network addresses than the first set.

In some embodiments, the first rule set may specify a set of network addresses for which packets should be dropped and the second rule set may specify a set of network addresses for which packets should be dropped. The second set of network addresses may include fewer network addresses than the first set. Alternatively, the second set of network addresses may include more network addresses than the first set.

In some embodiments, reconfiguring the network protection device to process packets in accordance with the second rule set may be performed in response to the network protection device receiving a message invoking the second rule set. Additionally or alternatively, reconfiguring the network protection device to process packets in accordance with the second rule set may be performed in response to one or more detected network conditions indicating a network attack.

Other details and features will be described in the sections that follow.

BRIEF DESCRIPTION OF THE DRAWINGS

Some features herein are illustrated by way of example, and not by way of limitation, in the figures of the accompanying drawings, in which like reference numerals refer to similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various connections between elements are discussed in the following description. These connections are general and, unless specified otherwise, may be direct or indirect, wired or wireless, physical or logical. In this respect, the specification is not intended to be limiting.

Figure 1:
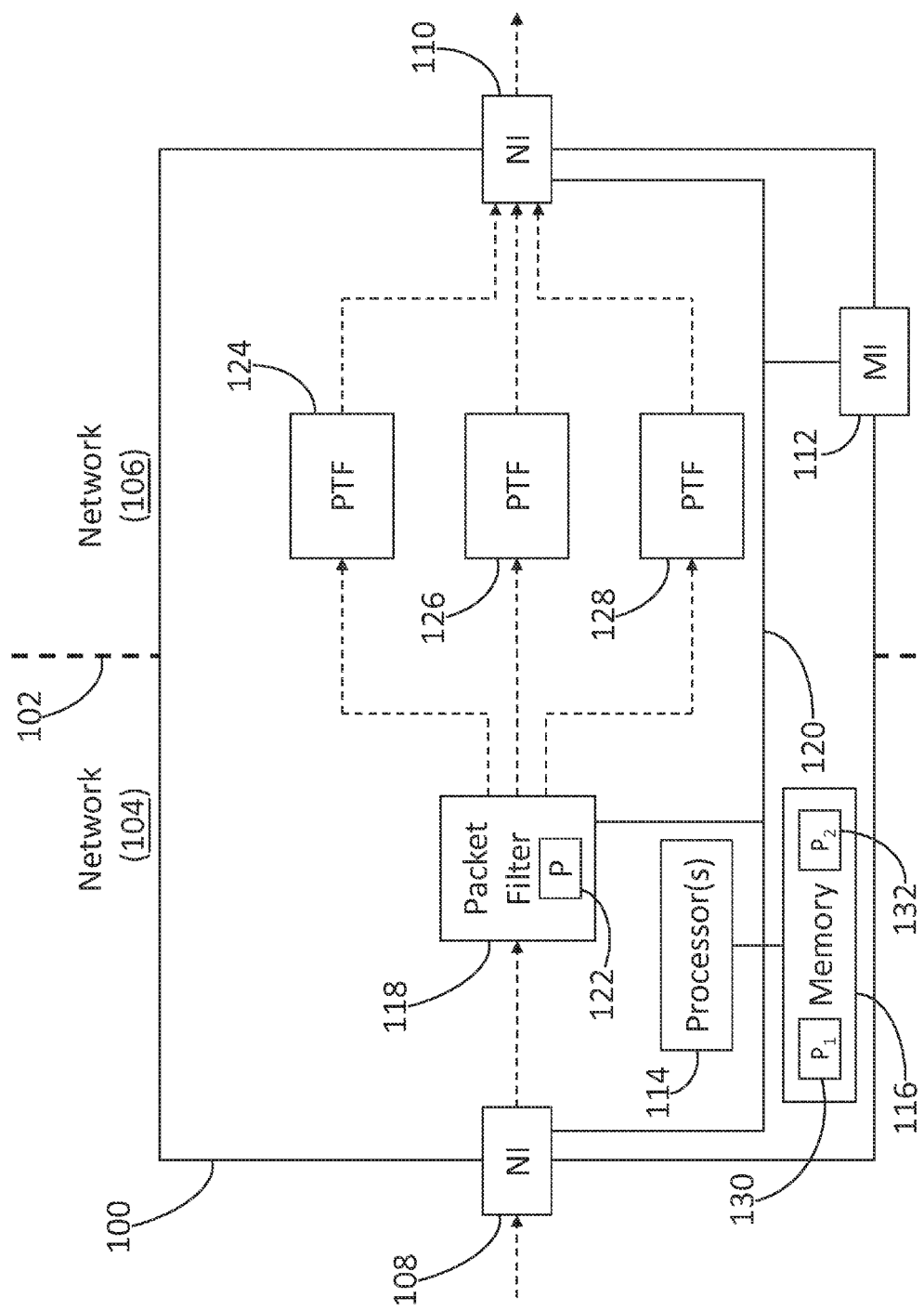
FIG. 1 illustrates an exemplary network protection device in which one or more aspects of the disclosure may be implemented.

FIG. 1 illustrates an exemplary network protection device in which one or more aspects of the disclosure may be implemented. Referring to FIG. 1, network protection device 100 may be located at boundary 102 between networks 104 and 106. As used herein, a network protection device includes any computing device having a processor, a memory, and a communication interface. Optionally, a network protection device may be configured to perform one or more additional functions as described herein. For example, network protection device 100 may be a firewall, gateway, router, or switch that interfaces networks 104 and 106. Network protection device 100 may include one or more network interfaces. For example, network protection device 100 may include network interface 108 for communicating with network 104, and network interface 110 for communicating with network 106. In some embodiments, network protection device 100 may include a management interface for providing an administrator with configuration access or provisioning network protection device 100 with one or more rule sets. For example, network protection device 100 may include management interface 112.

Network protection device 100 may also include one or more processors 114, memory 116, and packet filter 118. Network interfaces 108 and 110, management interface 112, processor(s) 114, memory 116, and packet filter 118 may be interconnected via data bus 120. Packet filter 118 may be configured to examine information specified by policy 122 with respect to packets received by network protection device 100 and forward the packets to one or more packet transformation functions specified by policy 122 based on the examined information. As used herein, a policy includes any combination of rules, rule sets, messages, instructions, files, data structures, or the like that specifies criteria corresponding to one or more packets and identifies a packet transformation function to be performed on packets corresponding to the specified criteria. Optionally, a policy may further specify one or more additional parameters as described herein.

Packet filter 118 may examine information specified by policy 122 with respect to packets received by network protection device 100 (e.g., packets received from network 104 via network interface 108) and forward the packets to one or more of packet transformation functions 124, 126, or 128 specified by policy 122 based on the examined information. Packet transformation functions 124, 126, and 128 may be configured to perform one or more functions on packets they receive from packet filter 118. For example, one or more of packet transformation functions 124, 126, and 128 may be configured to forward packets received from packet filter 118 into network 106, forward packets received from packet filter 118 to an Internet Protocol Security (IPsec) stack having an IPsec security association corresponding to the packets, or drop packets received from packet filter 118. Additionally or alternatively, one or more of packet transformation functions 124, 126, and 128 may be configured to forward one or more packets they receive to one or more other packet transformation functions (e.g., packet transformation function 124, 126, or 128), which may, in turn, perform one or more additional functions on the packets (e.g., log the packets, forward the packets into network 106, drop the packets, or forward the packets to one or more additional packet transformation functions for further processing). In some embodiments, one or more of packet transformation functions 124, 126, and 128 may be configured to drop packets by sending the packets to a local "infinite sink" (e.g., the /dev/null device file in a UNIX/ LINUX system). U.S. patent application Ser. No. 13/657, 010, filed Oct. 22, 2012, describes the use of packet transformation functions and is incorporated by reference herein in its entirety.

As indicated above, network protection devices (e.g., network protection device 100) may require time to switch between rule sets, and, as rule sets increase in complexity, the time required for switching between them may present obstacles for effective implementation.

For example, memory 116 may include policies 130 and 132. Each of policies 130 and 132 may include a rule set. In some embodiments, memory 116 may store policies 130 and 132's rule sets in one or more buffers. The buffers may be statically sized to one or more predetermined sizes or the size of the buffers may be dynamically adjusted based on the size of policies 130 and 132's rule sets. In order to optimize network protection device 100's implementation of policies 130 and 132 the rule set contained within policy 130 or policy 132 may be preprocessed prior to its implementation by network protection device 100. For example, recent advances in packet filtering technology have reduced the time required to apply large rule sets to network traffic. United States Patent Application Publication Nos. 2006/ 0195896 and 2006/0248580 to Fulp et al., and United States Patent Application Publication No. 2011/0055916 to Ahn, describe such advanced packet filtering technologies, and are each incorporated by reference herein in their entireties. In some embodiments, preprocessing policies 130 and 132's rule sets may include merging two or more rules within the rule sets into one rule, separating one or more rules within the rule sets into two or more rules, or reordering one or more rules within the rule sets.

While preprocessing a rule set prior to its implementation may optimize its application to packets, preprocessing a rule set may be a resource intensive process that may require a substantial period of time. In certain contexts (e.g., initial setup) the time required for preprocessing may be of little moment; however, in other contexts (e.g., when rule sets are being swapped live), the time required for preprocessing a rule set may adversely affect the performance of network protection device 100. For example, network protection device 100 may preprocess policy 130's rule set and then implement the preprocessed rule set with respect to network traffic flowing between networks 104 and 106. Later, it may be desired to reconfigure network protection device 100 to implement policy 132's rule set with respect to network traffic flowing between networks 104 and 106. Accordingly, policy 132's rule set may be preprocessed and network protection device 100 may be reconfigured to implement the preprocessed rule set with respect to network traffic flowing between networks 104 and 106. Utilizing such an approach, however, may result in network protection device 100 having to devote resources to preprocessing policy 132's rule set while simultaneously implementing policy 130's rule set with respect to traffic flowing between networks 104 and 106. Thus, network protection device 100 may have to wait until preprocessing of policy 132's rule set is completed before switching to policy 132. Moreover, this period may be extended due to network protection device 100's ongoing implementation of policy 130's rule set with respect to traffic flowing between networks 104 and 106.

Figure 2:
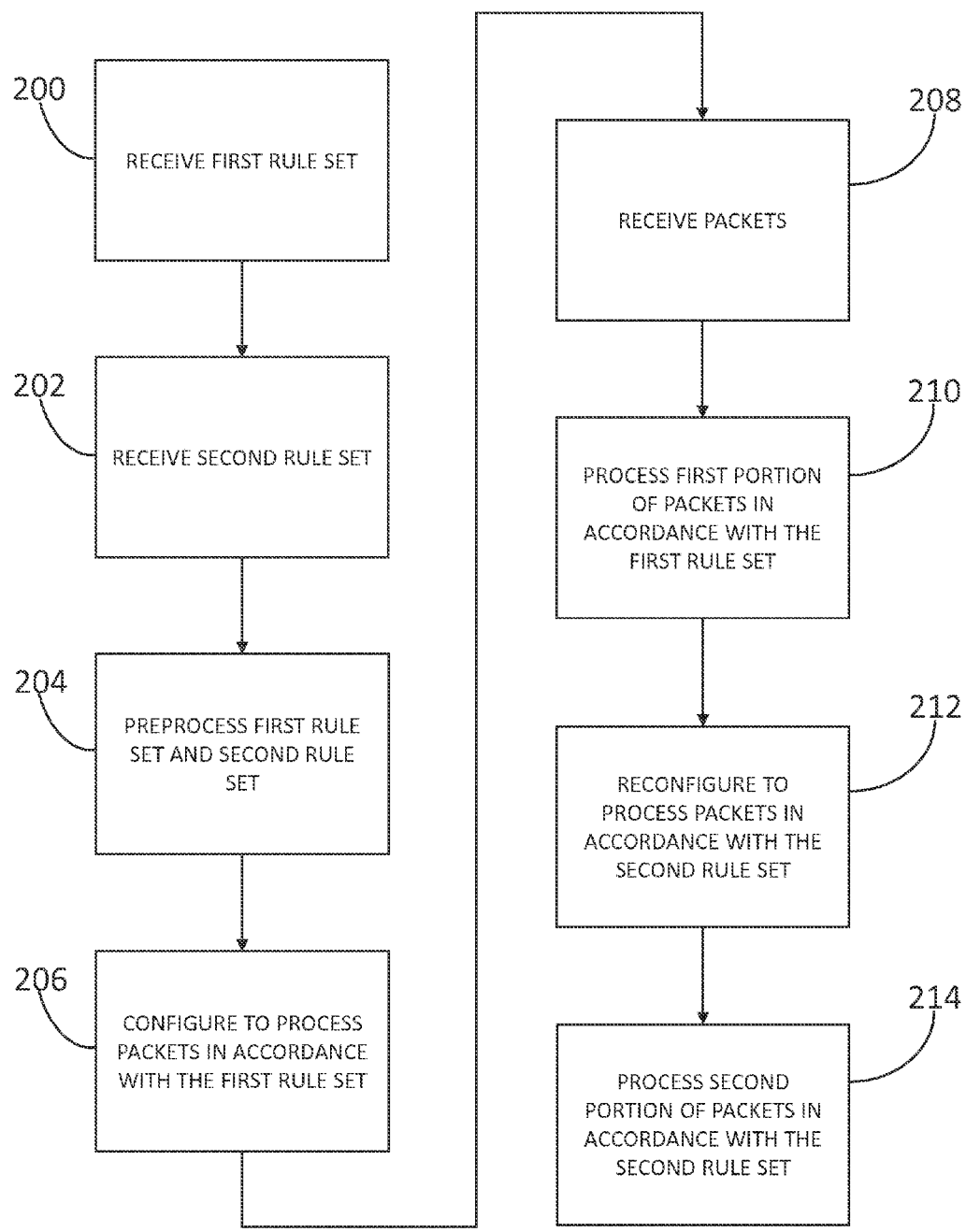
FIG. 2 illustrates an exemplary method for performing fast rule swapping.

In accordance with aspects of the disclosure, network protection device 100 may be configured to preprocess multiple rule sets prior to their implementation and thereby enable network protection device 100 to perform fast rule swapping between rule sets. FIG. 2 illustrates an exemplary method for performing fast rule swapping. Referring to FIG. 2, the steps may be performed by a network protection device, such as network protection device 100. At step 200, a first rule set may be received. For example, network protection device 100 may receive policy 130 via management interface 112. At step 202, a second rule set may be received. For example, network protection device 100 may receive policy 132 via management interface 112. At step 204, the first and second rule sets may be preprocessed. For example, network protection device 100 may preprocess both policy 130's rule set and policy 132's rule set. At step 206, the network protection device may be configured to process packets in accordance with the first rule set. For example, network protection device 100 may be configured to process packets flowing between networks 104 and 106 in accordance with policy 130's preprocessed rule set. At step 208, packets may be received. For example, network protection device 100 may receive packets from network 104 via network interface 108. At step 210, a first portion of the packets may be processed in accordance with the first rule set. For example, network protection device 100 may perform one or more packet transformation functions specified by policy 130's preprocessed rule set on a first portion of the packets received from network 104. At step 212, the network protection device may be reconfigured to process packets in accordance with the second rule set. For example, network protection device 100 may be reconfigured to process packets flowing between networks 104 and 106 in accordance with policy 132's preprocessed rule set. At step 214, a second portion of the packets may be processed in accordance with the second rule set. For example, network protection device 100 may perform one or more packet transformation functions specified by policy 132's preprocessed rule set on a second portion of the packets received from network 104.

It will be appreciated that by preprocessing both policy 130's rule set and policy 132's rule set prior to processing packets flowing between networks 104 and 106 in accordance with either of policy 130's rule set or policy 132's rule set, network protection device 100 may swap or switch between policy 130's rule set and policy 132's rule set more efficiently. For example, because policy 132's rule set is preprocessed prior to network protection device 100 being reconfigured to process packets in accordance with policy 132's rule set, network protection device 100 is not required to preprocess policy 132's rule set at the time network protection device 100 is switching between policy 130's rule set and policy 132's rule set. Moreover, network protection device 100 may be able to preprocess policy 132's rule set more efficiently because it may not be required to simultaneously process packets in accordance with policy 130's rule set.

In some embodiments, network protection device 100 may be configured to store configuration information associated with policy 130's rule set or policy 132's rule set. Such configuration information may later be utilized to reconfigure network protection device 100 to process packets in accordance with policy 130's rule set or policy 132's rule set (e.g., to swap or switch back to processing packets in accordance with a rule set network protection device 100 has previously processed packets in accordance with).

Due to the large number of rules a rule set may contain and the high volume of traffic a network protection device may be required to efficiently process, a network protection device may include multiple processors for processing packets in accordance with a rule set. Such a multi-processor network protection device may distribute packets amongst its processors for processing in accordance with a rule set.

Figure 3A:
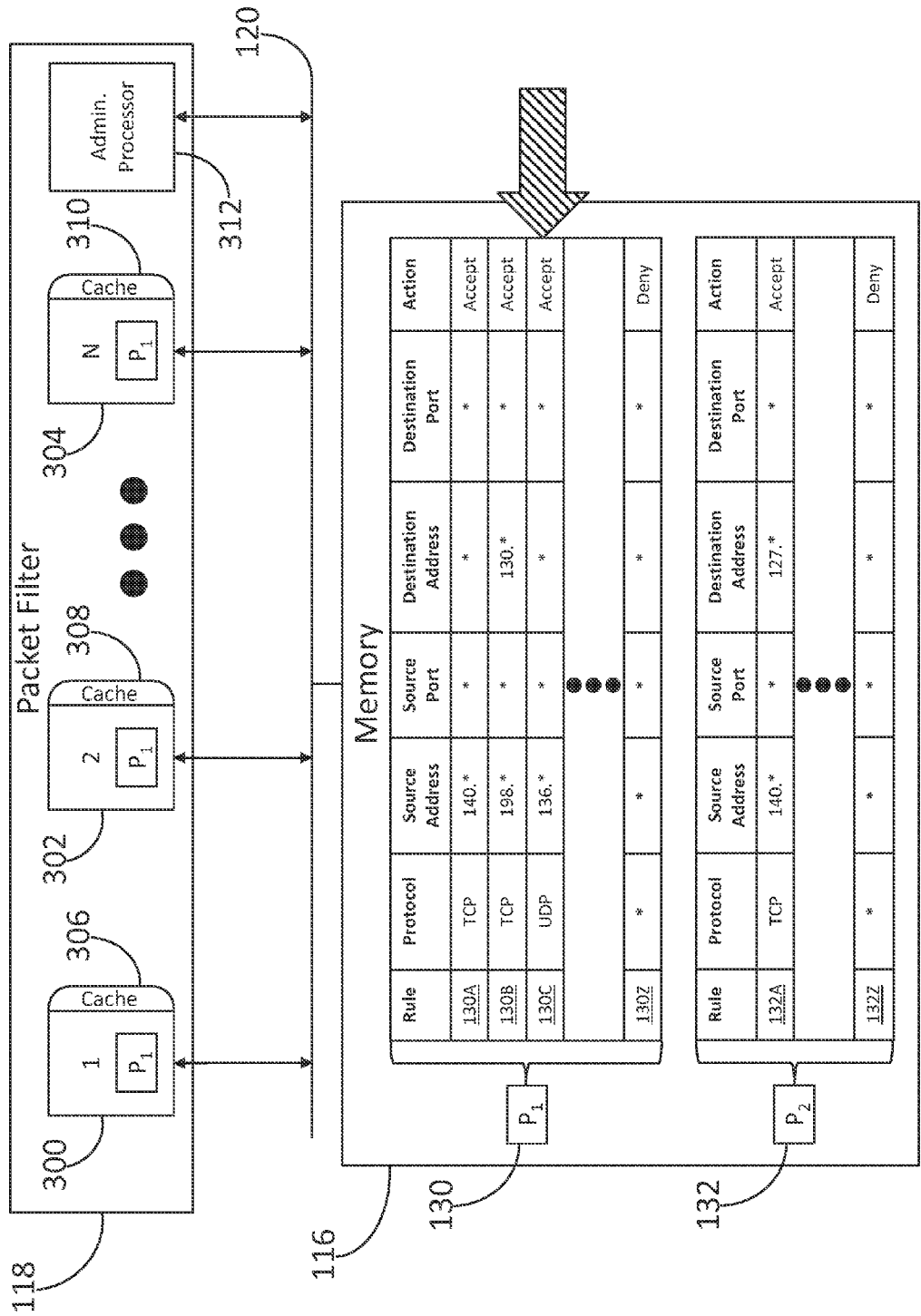
FIGS. 3A-3F illustrate aspects of an exemplary network protection device synchronizing multiple processors performing fast rule swapping.

FIGS. 3A-3F illustrate aspects of an exemplary network protection device synchronizing multiple processors performing fast rule swapping. Referring to FIG. 3A, as indicated above, network protection device 100 may include packet filter 118. Packet filter 118 may include one or more processor(s). For example, packet filter 118 may include processors 300, 302, and 304. Each of processors 300, 302, and 304 may be associated with a memory cache. For example, processor 300 may be associated with cache 306. Similarly, processor 302 may be associated with cache 308 and processor 304 may be associated with cache 310. Packet filter 118 may further include one or more administrative processors for controlling or coordinating its processors. For example, packet filter 118 may include administrative processor 312 for controlling or coordinating processors 300, 302, and 304. As indicated above, network protection device 100 may be configured to swap or switch between processing packets in accordance with one rule set to processing packets in accordance with a different rule set. In multi-processor embodiments, it may be advantageous to synchronize the processors involved in processing packets in accordance with the rule sets. For example, policy 130's rule set may include rules 130A, 130B, and 130C-130Z; and policy 132's rule set may include rules 132A-132Z. It will be appreciated, that either or both of policies 130 and 132's rule sets may include more than the number of rules illustrated (e.g., either or both of policies 130 and 132's rule sets may include hundreds of thousands or millions of individual rules).

Each of the individual rules within either of policies 130 or 132's rule sets may specify criteria (e.g., a set of network addresses) and an action (e.g., accept or deny) to be performed on packets matching the specified criteria. For example, rule 130A may specify that packets containing TCP packets, originating from a source IP address that begins with 140, having any source port, destined for any IP address, and destined for any port should have an accept packet transformation function performed on them. Similarly, rule 130B may specify that packets containing TCP packets, originating from a source IP address that begins with 198, having any source port, destined for an IP address that begins with 130, and destined for any port should have an accept packet transformation function performed on them; rule 130C may specify that packets containing UDP packets, originating from a source IP address that begins with 136, having any source port, destined for any IP address, and destined for any port should have an accept packet transformation function performed on them; rule 130Z may specify that packets containing packets of any protocol, originating from any IP source address, having any source port, destined for any IP address, and destined for any port should have a deny packet transformation function performed on them; rule 132A may specify that packets containing TCP packets, originating from a source IP address that begins with 140, having any source port, destined for any IP address than begins with 127, and destined for any port should have an accept packet transformation function performed on them; and rule 132Z may specify that packets containing packets of any protocol, originating from any IP source address, having any source port, destined for any IP address, and destined for any port should have a deny packet transformation function performed on them.

The individual rules of policies 130 and 132's rule sets may execute in a linear fashion. That is, a packet being processed in accordance with policy 130's rule set may first be compared to the criteria specified by rule 130A. If the packet matches the criteria specified by rule 130A, the corresponding action may be performed on the packet and packet filter 118's processor(s) may move on to the next packet. If the packet does not match the criteria specified by rule 130A, then the packet is compared to the criteria specified by the next rule (e.g., rule 130B), and so on, until the packet matches the criteria specified by a rule and the corresponding action is performed on the packet. Thus, for a multi-processor network protection device, individual processors may be comparing different individual packets to different rules within a given rule set when it is determined that the network protection device should swap or switch the rule set the packets are being processed in accordance with.

For example, at a time when it is determined that network protection device 100 should swap or switch from processing packets in accordance with policy 130's rule set to processing packets in accordance with policy 132's rule set, processor 300 may be beginning to process a packet than does not match the criteria of any of policy 130's rule set's rules other than rule 130Z. Thus, processor 300 may be required to compare the packet being processed to a large number of additional rules—potentially millions—before reaching the rule whose criteria the packet will match (e.g., rule 130Z). In contrast, at the time it is determined that network protection device 100 should swap or switch from processing packets in accordance with policy 130's rule set to processing packets in accordance with policy 132's rule set, processor 302 may be beginning to process a packet that matches the criteria specified by rule 130A, and will therefore process the packet relatively quickly compared to processor 300. Thus, if processors 300 and 302 each reconfigure to process packets in accordance with policy 132's rule set upon completion of processing their respective packets, processor 302 may begin processing packets in accordance with policy 132's rule set while processor 300 continues to process packets in accordance with policy 130's rule set. Accordingly, it may be advantageous to synchronize processors 300, 302, and 304's implementation of policy 132's rule set.

Figure 3B:
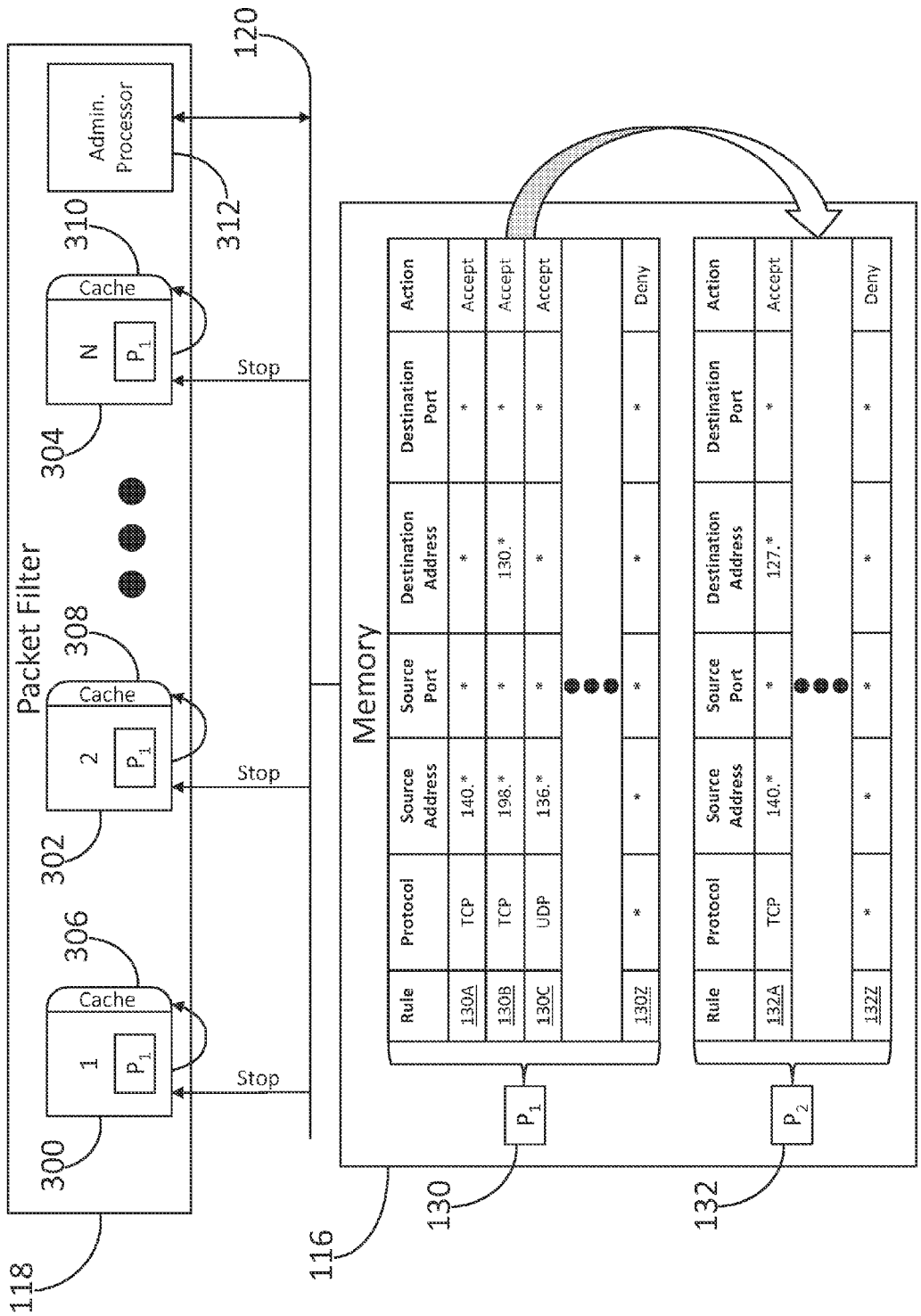

Referring to FIG. 3B, when it is determined that network protection device 100 should swap or switch from processing packets in accordance with policy 130's rule set to processing packets in accordance with policy 132's rule set, each of processors 300, 302, and 304 may be signaled by administrative processor 312 (e.g., via data bus 120) to stop processing packets. In some embodiments, processors 300, 302, and 304 may be signaled via the same channel over which they receive packets (e.g., data bus 120). For example, a control packet, indicting the policy swap, may be sent to each of processors 300, 302, and 304. In some embodiments, such a control packet may comprise a header value (e.g., a negative integer) that would not exist in a real network packet (e.g., a packet received from network 104). Additionally or alternatively, packets sent to processors 300, 302, and 304 may be encapsulated within meta packets and the meta packets may include information indicating whether they are control packets (e.g., packets indicating that processors 300, 302, and 304 should swap from processing packets in accordance with policy 130's rule set to processing packets in accordance with policy 132's rule set) or packets containing real network packets (e.g., packets received from network 104).

In some embodiments, each of processors 300, 302, and 304 may finish processing the packet they are currently processing and then cease processing packets. In other embodiments, each of processors 300, 302, and 304 may cease processing packets and cache the packet they are currently processing for future processing in accordance with policy 132's rule set. In any of the aforementioned embodiments, once a processor has ceased processing packets, it may cache any additional packets for future processing in accordance with policy 132's rule set. For example, processor 300 may cache any unprocessed packets in cache 306. Similarly, processor 302 may cache any unprocessed packets in cache 308 and processor 304 may cache any unprocessed packets in cache 310.

Figure 3C:
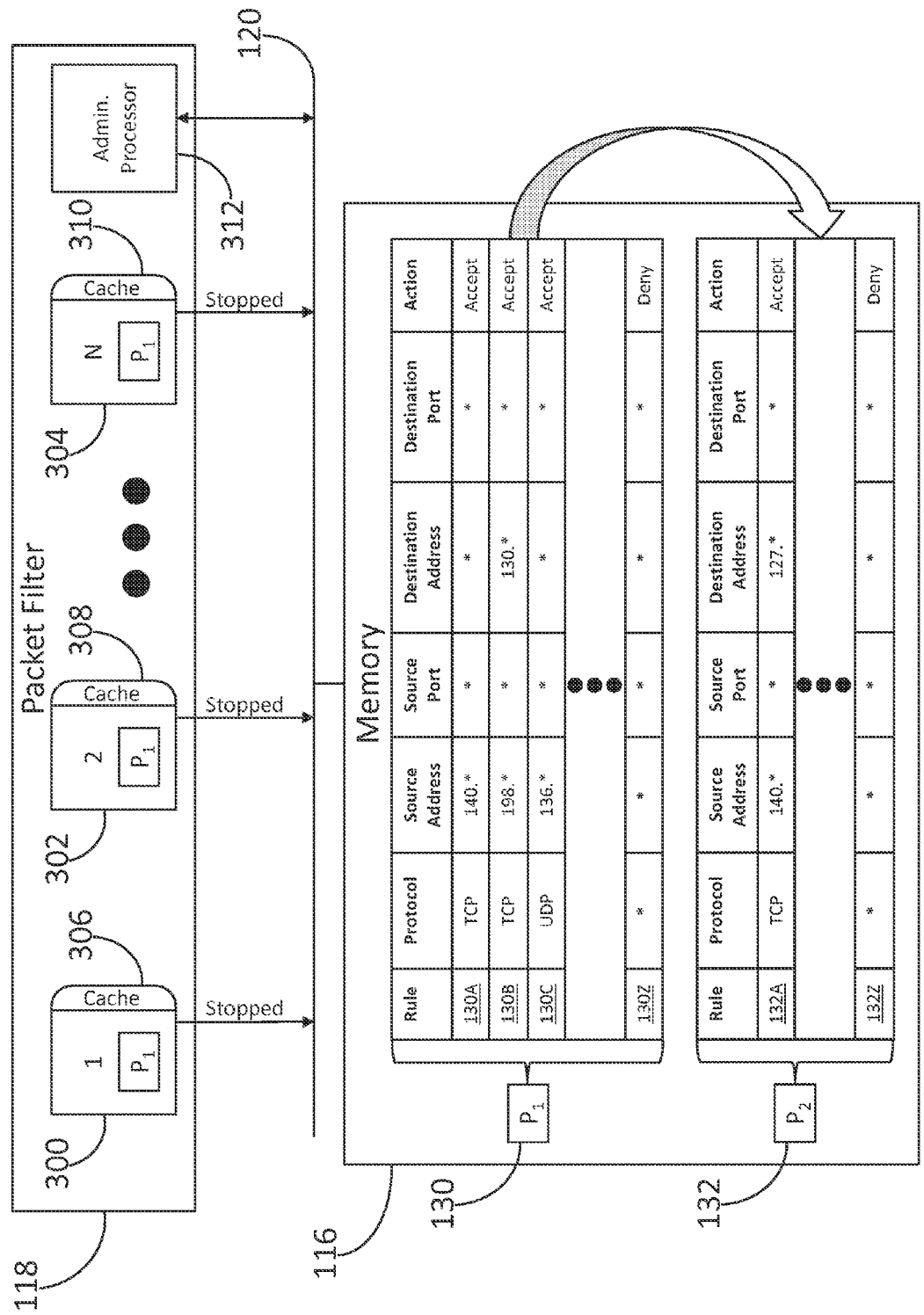
Figure 3D:
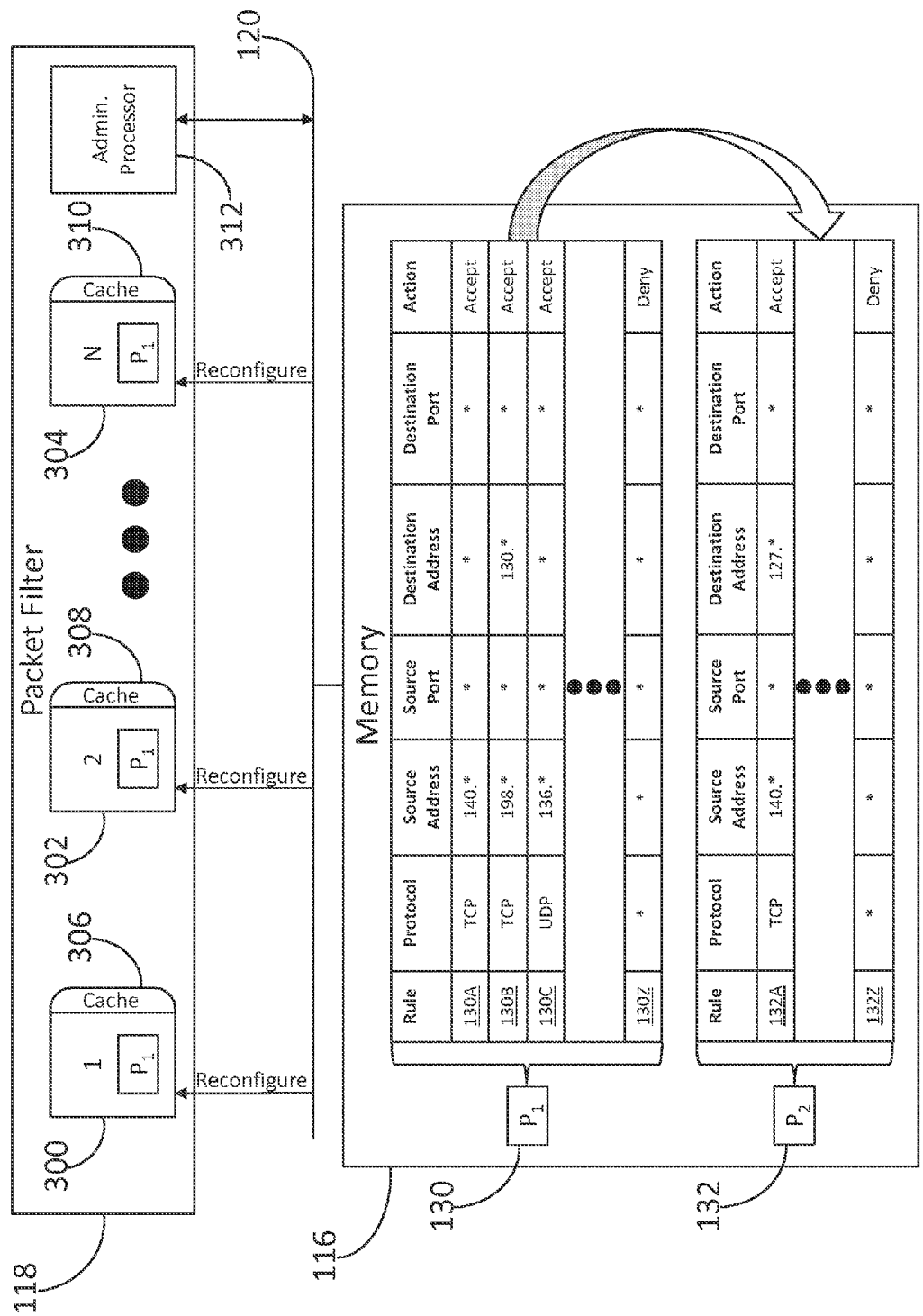
Figure 3E:
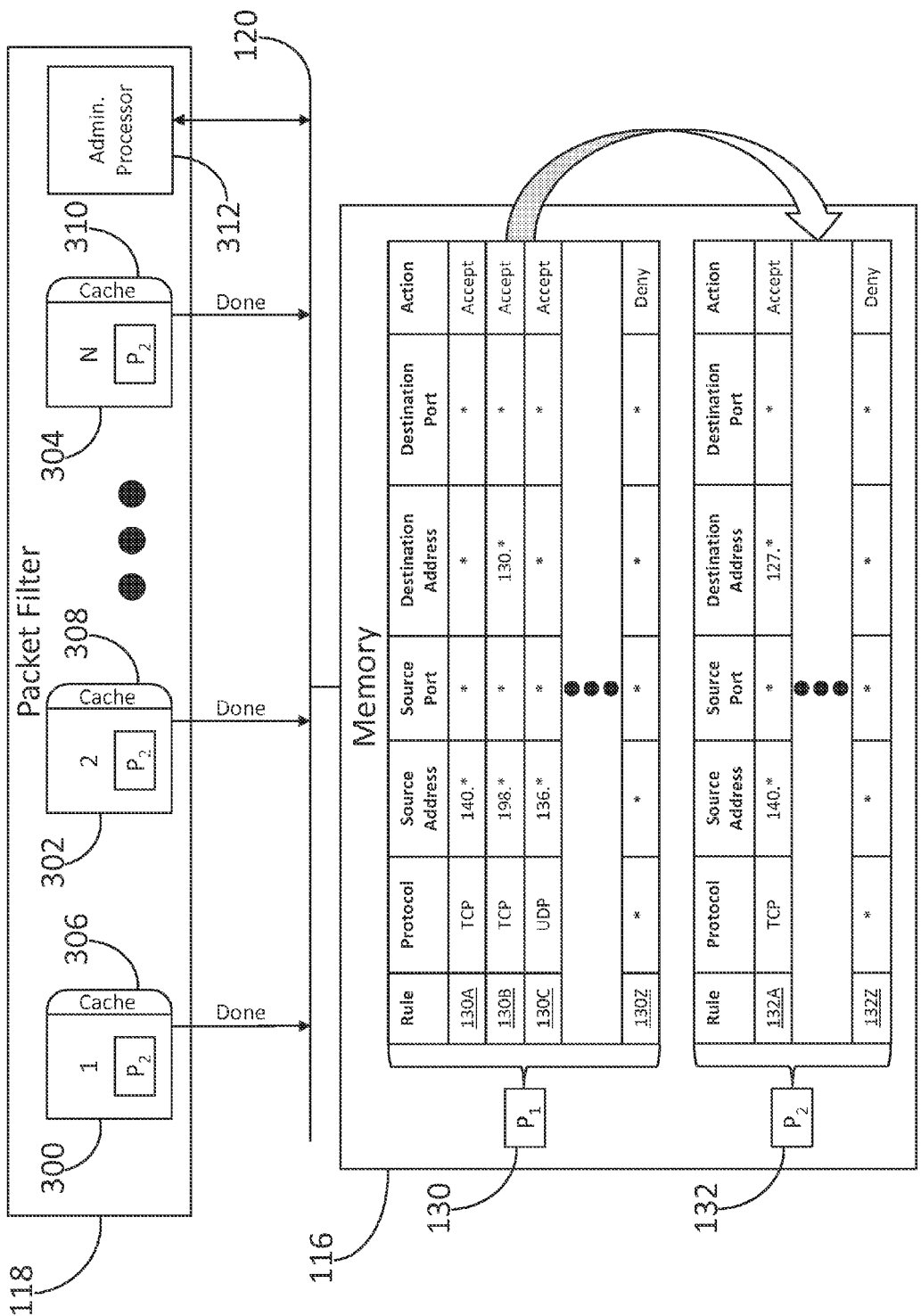
Figure 3F:
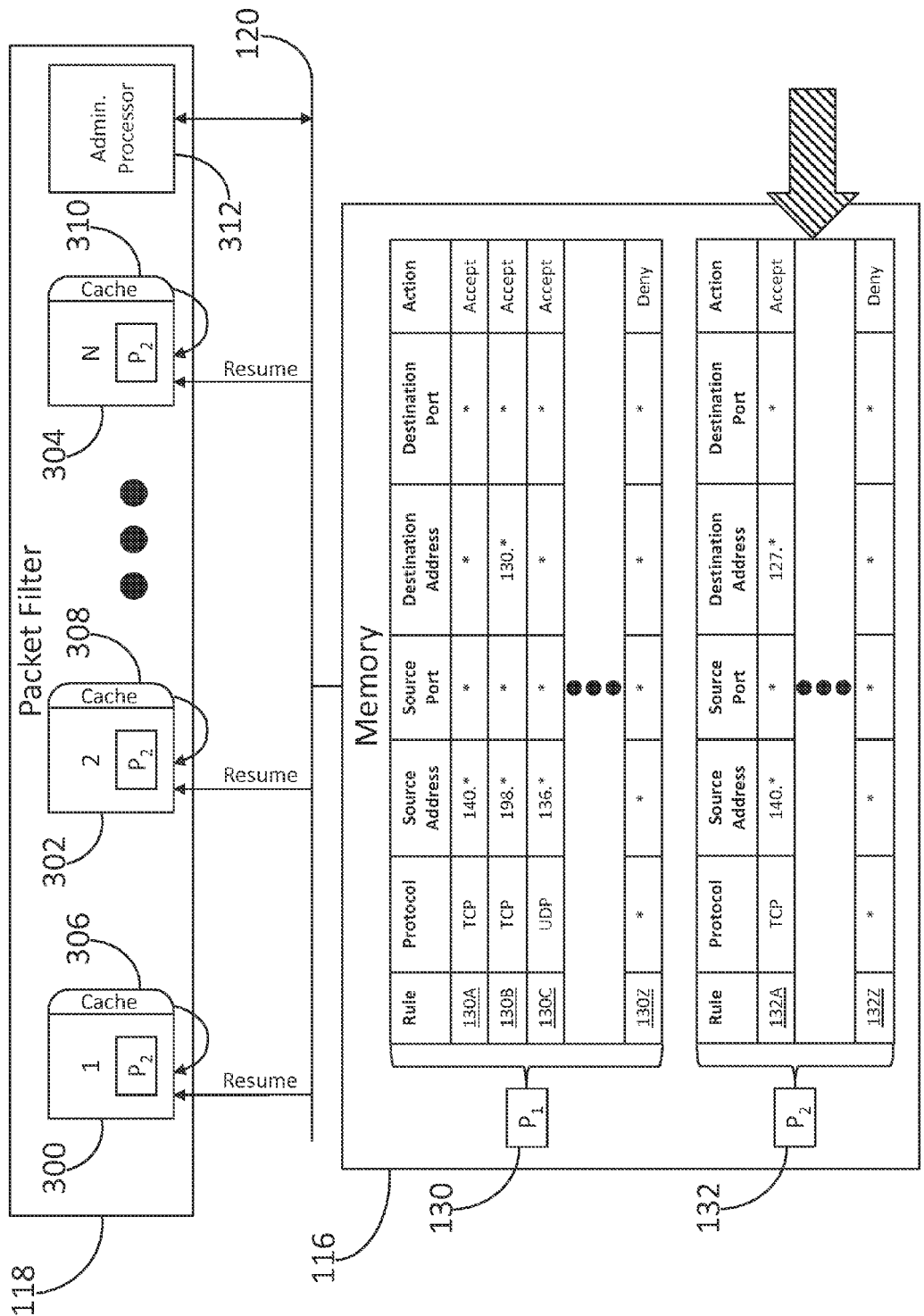

Referring to FIG. 3C, upon ceasing to process packets (e.g., when a current packet has been examined against the rules in policy 130's rule set), each of processors 300, 302, and 304 may signal administrative processor 312 that they have stopped processing packets. Referring to FIG. 3D, once each of processors 300, 302, and 304 have signaled that they have stopped processing packets, each of processors 300, 302, and 304 may be reconfigured to process packets in accordance with policy 132's rule set. Referring to FIG. 3E, once reconfigured to process packets in accordance with policy 132's rule set, each of processors 300, 302, and 304 may signal administrative processor 312 that they have been successfully reconfigured. Referring to FIG. 3F, once each of processors 300, 302, and 304 have signaled that they have been successfully reconfigured, each of processors 300, 302, and 304 may resume processing packets. For example, processors 300, 302, and 304 may begin by processing any packets respectively stored in caches 306, 308, and 310, and then may process additional packets received from network 104 via network interface 108.

By synchronizing the implementation of policy 132's rule set across processors 300, 302, and 304, packets processed by network protection device 100 at any given time may receive uniform treatment irrespective of the particular processor which handles them. Because both policy 130's rule set and policy 132's rule set may be preprocessed prior to processing any packets in accordance with either of policies 130 or 132's rule sets, the time required to reconfigure network protection device 100 to process packets in accordance with policy 132's rule set may be reduced. Reducing the time required to swap or switch between processing packets in accordance with policy 130's rule set and policy 132's rule set may be particularly advantageous in certain contexts. For example, policy 130's rule set may specify a set of network address for which packets should be accepted (e.g., a set of network addresses corresponding to devices for which communications should be supported under normal network conditions) and that all other packets should be denied. Policy 132's rule set may specify a smaller set of network addresses for which packets should be accepted than that specified by policy 130's rule set (e.g., a set of network addresses corresponding to devices for which communications should be supported under demanding network conditions), and may further specify that all other packets should be denied. In the event of a network attack (e.g., a Distributed Denial-of-Service (DDoS) attack) or detection of one or more network conditions indicating a network attack, network protection device 100 may switch from processing packets in accordance with policy 130's rule set to processing packets in accordance with policy 132's rule set (e.g., in an effort to mitigate the effects of the attack). Accordingly, the faster network protection device 100 can switch from processing packets in accordance with policy 130's rule set to processing packets in accordance with policy 132's rule set, the greater the likelihood that the effects of the attack may be mitigated.

Figure 4:
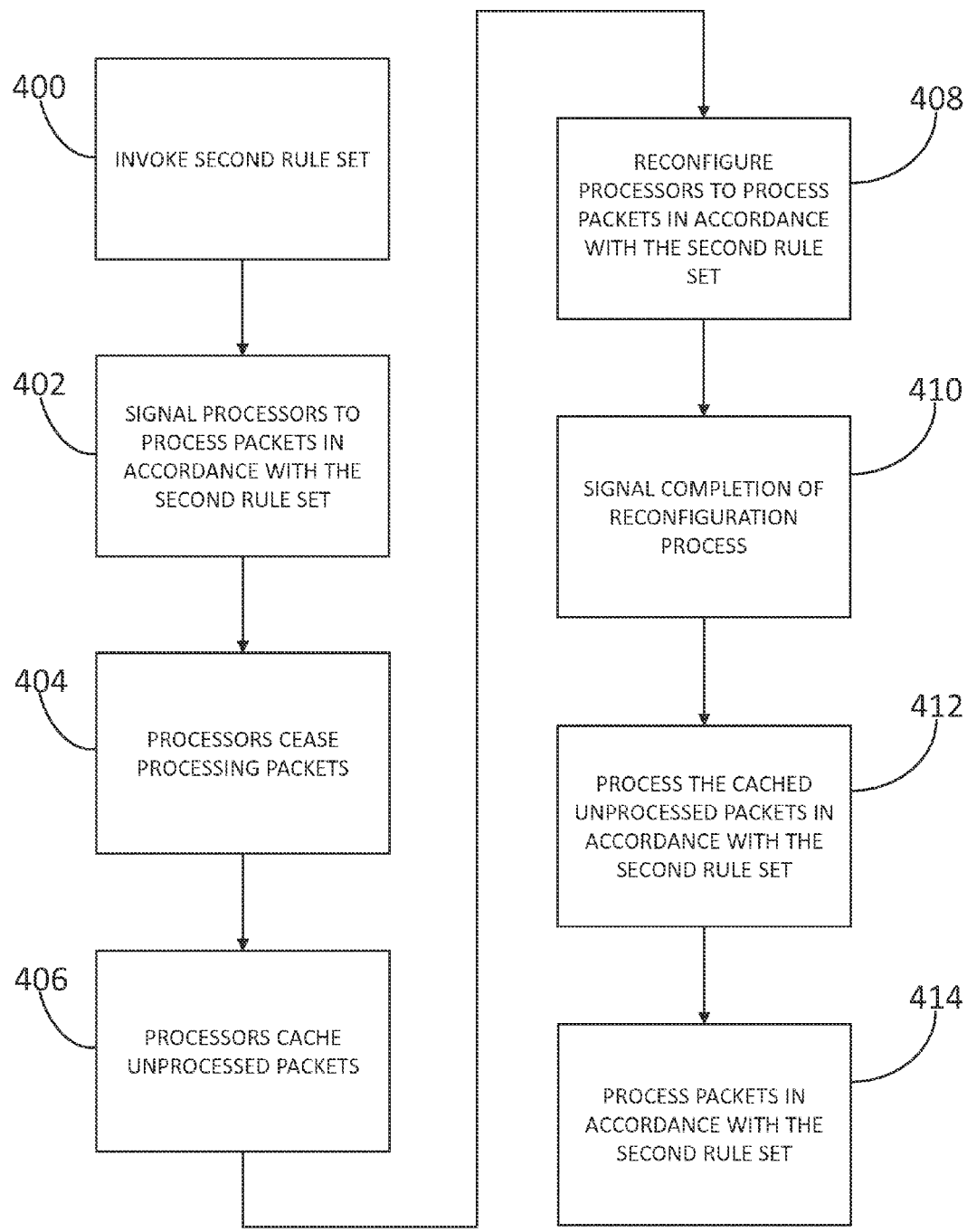
FIG. 4 illustrates an exemplary method for synchronizing multiple processors performing fast rule swapping.

FIG. 4 illustrates an exemplary method for synchronizing multiple processors performing fast rule swapping. Referring to FIG. 4, the steps may be performed by a network protection device, such as network protection device 100. At step 400, the second rule set may be invoked. For example, network protection device 100 may receive a message invoking policy 132's rule set or one or more network conditions indicating a network attack may be detected. At step 402, one or more of the network protection device's processors responsible for processing packets may be signaled to process packets in accordance with the second rule set. For example, processors 300, 302, and 304 may be signaled to process packets in accordance with policy 132's rule set. At step 404, the one or more processors of the network protection device responsible for processing packets may cease processing packets. For example, each of processors 300, 302, and 304 may cease processing packets in accordance with policy 300's rule set. At step 406, the one or more processors of the network protection device responsible for processing packets may cache any unprocessed packets. For example, each of processors 300, 302, and 304 may respectively cache any unprocessed packets in caches 306, 308, and 310. At step 408, the one or more processors of the network protection device responsible for processing packets may be reconfigured to process packets in accordance with the second rule set. For example, each of processors 300, 302, and 304 may be reconfigured to process packets in accordance with policy 132's rule set. At step 410, the one or more processors of the network protection device responsible for processing packets may signal completion of the reconfiguration process. For example, each of processors 300, 302, and 304 may signal completion of their respective reconfiguration processes. At step 412, the one or more processors of the network protection device responsible for processing packets may process any cached unprocessed packets in accordance with the second rule set. For example, each of processors 300, 302, and 304 may respectively process any unprocessed packets previously cached in caches 306, 308, and 310 in accordance with policy 132's rule set. At step 414, additional packets may be processed in accordance with the second rule set. For example, each of processors 300, 302, and 304 may process additional packets received from network 104 in accordance with policy 132's rule set.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data processing device. The computer-executable instructions may be stored on a computer-readable medium such as a hard disk, optical disk, removable storage media, solid state memory, RAM, etc. As will be appreciated, the functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Although not required, one of ordinary skill in the art will appreciate that various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing servers and one or more networks. The functionality may be distributed in any manner, or may be located in a single computing device (e.g., a server, a client computer, etc.).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional.

What is claimed is:

1. A method comprising:
preprocessing, by a network device, a first rule set and a second rule set;
configuring the network device to process packets in accordance with the first rule set;
receiving, after the preprocessing and the configuring, by the network device, a plurality of packets;
processing, by the network device, a first portion of the plurality of packets in accordance with the first rule set;
signaling the network device to process packets in accordance with the second rule set; and
responsive to the signaling:
 ceasing processing of one or more packets;
 caching the one or more packets;
 reconfiguring the network device to process packets in accordance with the second rule set;
 signaling completion of reconfiguration to process packets in accordance with the second rule set; and
 responsive to the signaling completion of reconfiguration, processing the one or more cached packets in accordance with the second rule set.

2. The method of claim 1, further comprising:
storing, by the network device, configuration information for processing packets in accordance with the first rule set;
reconfiguring, by the network device, the network device to process packets in accordance with the first rule set based on the stored configuration information; and
processing, after the reconfiguring, by the network device, a second portion of the plurality of packets in accordance with the first rule set.

3. The method of claim 1, further comprising:
storing, by the network device, the first rule set and the second rule set in a memory buffer; and dynamically adjusting, by the network device, a size of the memory buffer based on at least one of a size of the first rule set or a size of the second rule set.

4. The method of claim 1, wherein the signaling the network device to process packets in accordance with the second rule set is responsive to the network device receiving a message invoking the second rule set.

5. The method of claim 1, wherein the signaling the network device to process packets in accordance with the second rule set is responsive to one or more detected network conditions indicating a network attack.

6. The method of claim 1, wherein the preprocessing comprises merging a plurality of rules included in at least one of the first rule set or the second rule set into a single rule.

7. The method of claim 1, wherein the preprocessing comprises separating a rule included in at least one of the first rule set or the second rule set into a plurality of rules.

8. The method of claim 1, wherein the preprocessing comprises reordering one or more rules included in at least one of the first rule set or the second rule set.

9. A system comprising:
a plurality of processors; and
a memory comprising instructions that when executed by at least one processor of the plurality of processors cause the system to:
preprocess a first rule set and a second rule set;
configure the system to process packets in accordance with the first rule set;
receive, after the preprocess and the configure, a plurality of packets;
process a first portion of the plurality of packets in accordance with the first rule set;
signal to process packets in accordance with the second rule set; and
responsive to the signal to process packets in accordance with the second rule set:
cease processing of one or more packets;
cache the one or more packets;
reconfigure the system to process packets in accordance with the second rule set;
signal completion of reconfiguration to process packets in accordance with the second rule set; and
responsive to the signal of completion of reconfiguration, process the one or more cached packets in accordance with the second rule set.

10. The system of claim 9, wherein the instructions, when executed by the at least one processor, further cause the system to:
store configuration information for processing packets in accordance with the first rule set;
reconfigure the system to process packets in accordance with the first rule set based on the stored configuration information; and
process, after the reconfiguring, a second portion of the plurality of packets in accordance with the first rule set.

11. The system of claim 9, wherein the instructions, when executed by the at least one processor, further cause the system to:
store the first rule set and the second rule set in a memory buffer; and
dynamically adjust a size of the memory buffer based on at least one of a size of the first rule set or a size of the second rule set.

12. The system of claim 9, wherein the instructions, when executed by the at least one processor, cause the system to signal to process packets in accordance with the second rule set in response to the system receiving a message invoking the second rule set.

13. The system of claim 9, wherein the instructions, when executed by the at least one processor, cause the system to signal to process packets in accordance with the second rule set in response to one or more detected network conditions indicating a network attack.

14. The system of claim 9, wherein the instructions to preprocess the first rule set and the second rule set comprise instructions to merge a plurality of rules included in at least one of the first rule set or the second rule set into a single rule.

15. The system of claim 9, wherein the instructions to preprocess the first rule set and the second rule set comprise instructions to separate a rule included in at least one of the first rule set or the second rule set into a plurality of rules.

16. The system of claim 9, wherein the instructions to preprocess the first rule set and the second rule set comprise instructions to reorder one or more rules included in at least one of the first rule set or the second rule set.

17. One or more non-transitory computer-readable media comprising instructions that when executed by a computing system cause the computing system to:
preprocess a first rule set and a second rule set;
configure the computing system to process packets in accordance with the first rule set;
receive a plurality of packets;
process a first portion of the plurality of packets in accordance with the first rule set;
signal to process packets in accordance with the second rule set; and
responsive to the signal to process packets in accordance with the second rule set:
cease processing of one or more packets;
cache the one or more packets;
reconfigure the computing system to process packets in accordance with the second rule set;
signal completion of reconfiguration to process packets in accordance with the second rule set; and
responsive to the signal of completion of reconfiguration, process the one or more cached packets in accordance with the second rule set.

18. The one or more non-transitory computer-readable media of claim 17, wherein the instructions, when executed by the computing system, cause the computing system to:
store configuration information for processing packets in accordance with the first rule set;
reconfigure the computing system to process packets in accordance with the first rule set based on the stored configuration information; and
process, after the reconfiguring, a second portion of the plurality of packets in accordance with the first rule set.

19. The one or more non-transitory computer-readable media of claim 17, wherein the instructions, when executed by the computing system, cause the computing system to:
store the first rule set and the second rule set in a memory buffer; and
dynamically adjust a size of the memory buffer based on at least one of a size of the first rule set or a size of the second rule set.

20. The one or more non-transitory computer-readable media of claim 17, wherein the instructions to preprocess the first rule set and the second rule set comprise: instructions to merge a first plurality of rules included in at least one of the first rule set or the second rule set into a single rule; instructions to separate a rule included in at least one of the first rule set or the second rule set into a second plurality of rules; or instructions to reorder one or more rules included in at least one of the first rule set or the second rule set.

\* \* \* \* \*

(12) INTER PARTES REVIEW CERTIFICATE (2534th)
United States Patent
Ahn et al.

(10) Number: US 9,674,148 K1
(45) Certificate Issued: Jan. 14, 2022

(54) RULE SWAPPING IN A PACKET NETWORK

(71) Applicants: David K. Ahn; Steven Rogers; Sean Moore

(72) Inventors: David K. Ahn; Steven Rogers; Sean Moore

(73) Assignee: CENTRIPETAL NETWORKS, INC.

Trial Number:

IPR2018-01454 filed Aug. 10, 2018

Inter Partes Review Certificate for:

Patent No.: 9,674,148
Issued: Jun. 6, 2017
Appl. No.: 14/921,718
Filed: Oct. 23, 2015

The results of IPR2018-01454 are reflected in this inter partes review certificate under 35 U.S.C. 318(b).

INTER PARTES REVIEW CERTIFICATE
U.S. Patent 9,674,148 K1
Trial No. IPR2018-01454
Certificate Issued Jan. 14, 2022

AS A RESULT OF THE INTER PARTES REVIEW PROCEEDING, IT HAS BEEN DETERMINED THAT:

Claims 1-20 are cancelled.

\* \* \* \* \*